July 2, 1940.  G. SLAYTER  2,206,060
METHOD AND APPARATUS FOR FIBERIZING VITREOUS MATERIAL
Filed March 22, 1938  2 Sheets-Sheet 1
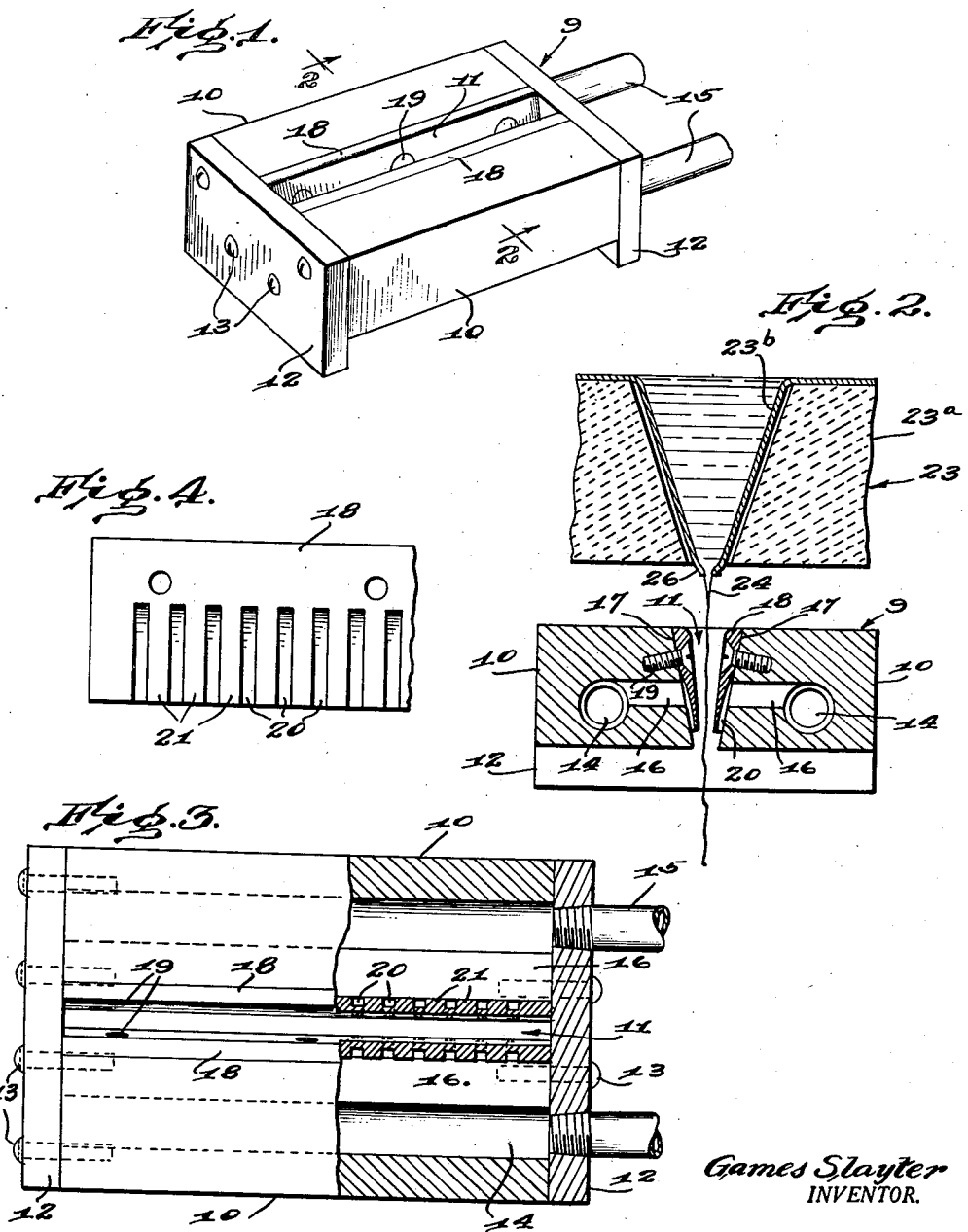
Games Slayter
INVENTOR.
BY Rule & Hoge
ATTORNEYS.

July 2, 1940.        G. SLAYTER        2,206,060
METHOD AND APPARATUS FOR FIBERIZING VITREOUS MATERIAL
Filed March 22, 1938        2 Sheets-Sheet 2

Games Slayter
INVENTOR.

BY Rule & Noye
ATTORNEYS.

Patented July 2, 1940

2,206,060

UNITED STATES PATENT OFFICE 2,206,060

METHOD AND APPARATUS FOR FIBERIZING VITREOUS MATERIAL

Games Slayter, Newark, Ohio, assignor, by mesne assignments, to Owens-Corning Fiberglas Corporation, a corporation of Delaware Application March 22, 1938, Serial No. 197,442

18 Claims. (Cl. 49—1)

The present invention relates to methods and apparatus for reducing molten glass or the like to fine fibers. The apparatus herein disclosed is designed for making glass fibers by methods which comprise flowing the molten glass in small streams from furnace outlets, drawing the streams to attenuated fibers by means of powerful blasts of steam, air or other gas, and causing the fibers to solidify as they are drawn and accumulate, as disclosed in the copending application filed jointly by Thomas and me, Serial Number 704,028, filed December 26, 1933, now patented under No. 2,133,236.

An object of the invention is to provide a practical form of apparatus by which a multiplicity of fine glass fibers may be rapidly and simultaneously produced and accumulated.

A further object of the invention is to provide a novel blowing apparatus by which various methods of making fine fibrous glass may be practiced, and by which glass fibers may be produced which have different characteristics, depending upon the particular method employed. A method which has been practiced to a limited extent in producing fibrous glass consists in flowing a stream of vitreous glass through an annular blower and drawing it by the force of a steam blast or the like to fibrous condition, as described in the Thomas patent, Number 2,016,401. This is necessarily a slow process. Multiplication of such blowers to any extent is also impractical, owing to the large amount of space required for the blowers, the small number that could be used at any one time with a single furnace, the practical difficulty or impossibility of maintaining for all the blowers the uniformity of temperature, and other conditions which would be necessary for a satisfactory, simultaneous operation. Moreover, when feeding a single stream into such a blower, it has been conventional to use a relatively thick, viscous stream, which, when acted upon by the annular blast, was disrupted and atomized into a multiplicity of relatively short fibers, each of said fibers having a knob-like head and a tail projecting therefrom. The stream was shattered and blasted and was caused to branch along its length into a multiplicity of relatively short length fibers. Such method commonly produced a large amount of shot and also resulted in a lack of uniformity of fiber diameter.

The present invention provides means for overcoming these difficulties, such means embodied in a practical form of blower with which a large number of streams, compactly arranged, may be simultaneously attenuated into long, fine filaments of glass.

A further object of the invention is to provide an arrangement of gas blasts which facilitate the attenuation of the individual glass streams with minimum consumption of steam or other gas. In this connection it is desired to facilitate the entry of the individual glass streams into the steam blasts. In producing this effect, we have provided an open pattern of gaseous blasts, into which surrounding atmospheric gases are easily induced, and the glass streams are enabled to penetrate through the pattern and be subjected to the force of the blast whereby they are continually seized and readily attenuated into long, fine fibers. I have discovered that by opening the steam blast pattern and providing an arrangement of spaced apart jets, the atmospheric air is readily induced principally through the relatively quiescent zones between the individual jets, and the molten glass is carried through these quiescent zones into the steam blast region. Without such an arrangement, the molten glass finds difficulty in penetrating into the steam jets and has a tendency to ride on top until a sufficient amount has accumulated, whereupon it may be driven through the jet and shot out into an incompletely attenuated particle.

Other objects and advantages of the present invention will become apparent from the following description taken in conjunction with the drawings, in which:

Fig. 1 is a perspective view of the blower constructed in accordance with my invention;

Fig. 2 is a cross-sectional, elevational view, in part diagrammatic, of a fiberizing apparatus, constructed in accordance with my invention, the blower unit thereof being a sectional elevation at the line II—II on Fig. 1;

Fig. 3 is a part sectional plan view of a portion of the blower, being broken away to illustrate the internal construction;

Fig. 4 is a fragmentary detail view of a baffle plate;

Figure 5:
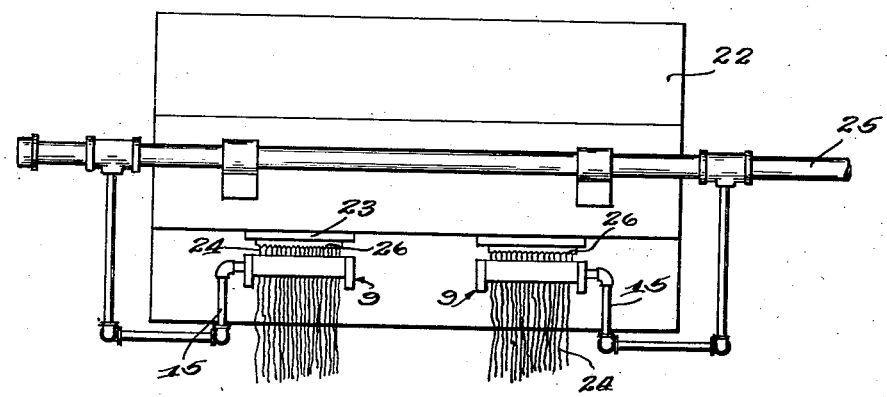
Fig. 5 is an elevation of an apparatus including a plurality of blowers and means for supplying a multiplicity of streams of molten material to each blower.
Figure 6:
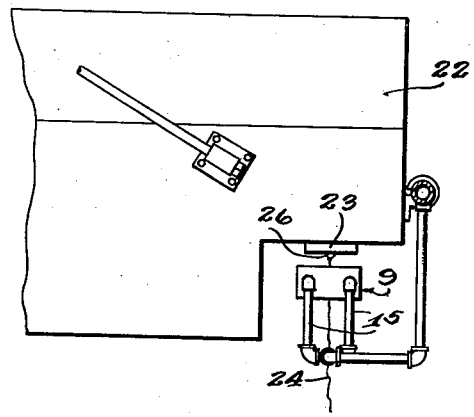
Fig. 6 is a side elevation showing a feeder booth and a blower associated therewith.

Referring particularly to Figs. 1 to 4, the body of the blower 9, as shown, comprises separate halves in the blocks 10 spaced apart to provide a passageway 11 through which the streams of molten glass 24 or the like are permitted to flow. The blower 9 is spaced under a feeder 23 comprising a refractory bushing 23ª and a liner 23ᵇ. The liner 23ᵇ may be downwardly convergent and provided at the lower end thereof with a series of outlet orifices 26 through which the glass streams 24 flow. The construction of the feeder 23 may be of any conventional type, such as, for example, illustrated and described in the French Patent Number 815,503.

End plates 12 on the blower 9 are secured by means of screws 13 to the blocks 10 and serve to hold the halves in predetermined spaced relationship and also to prevent air from being induced laterally into the passageway 11 where it could break up the steam pattern.

The blocks or halves are hollowed out to provide pressure chambers 14 extending throughout the length of the blocks. Steam or other gas under pressure is supplied to the chambers 14 through pipes 15, which open into said chambers at one end of the blower. The pipes 15 have a screw-threaded connection with an end plate 12 to provide a support to the blower.

The chambers 14 open into the passageway 11 through slots or openings 16 which extend from the chambers to the inner faces 17 of the blocks 10, thereby providing channels through which gas under pressure in the form of jets is directed into the passageway. The channels 16 preferably extend the full length of the blocks 10. Baffle plates 18 are attached to the said faces 17 by means of screws 19 and extend the entire length of the channels 16. The plates, as shown, extend from the upper surface of the blower downwardly over and beyond the channels 16. The inner face of each baffle plate is provided with narrow transverse grooves 20 cut or formed therein. These grooves are spaced at short intervals throughout the length of the plate and alternate with narrow ribs 21 between the grooves.

When the plates 18 are secured in position the grooves 20 overlie the channels 16 and extend downwardly below said channels, thereby providing a multiplicity of small, downwardly extending nozzles or passageways through which the steam or other gas issues. As the ribs 21 bear against the faces of the blocks 10, the grooves 20 are separated so that a multiplicity of separate channels are provided through which the issuing gas is directed. The surfaces 17 to which the baffle plates are attached are downwardly and inwardly inclined. The exposed faces of the plates 18 may also be downwardly and inwardly convergent, acting as skirts adapted to guide the steam jets inwardly so that the steam jets are caused to converge.

Figure 7:
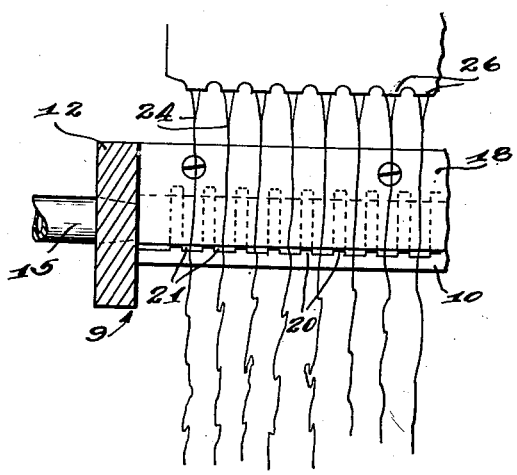
Fig. 7 is a fragmentary elevational view of a blower and feeder outlet illustrating the mode of penetration of the individual glass streams into the pattern of gaseous blasts.

The series of jets on opposite sides of the slot or passageway 11 are registered against each other so that the opposite pairs of jets are directed against each other and are caused to merge into a series of spaced apart blasts, separated by relatively quiescent zones into which the atmospheric gases are induced from over the top of the blowers. The outlets 26 are preferably arranged so that each stream of glass 24 is registered with and caused to enter into a relatively quiescent zone between the spaced apart jets (see Fig. 7). With this arrangement, mutual interference by adjacent streams is inhibited and each stream is permitted to pass freely through its allotted zone. However, more or less streams than zones may be used if desired. In so doing, the individual streams are drawn through the nearest quiescent zone and more than one stream may pass through a given zone simultaneously.

The angles of the grooves 20 and the inner face 17 relative to the direction of streams of glass entering the blower are important. I have found that satisfactory results can be obtained when the angle between the glass and the impinging jet is from about 10° to 14° and preferably about 12°, the angle of convergence between the opposite edges or faces 17 accordingly being about 24° more or less. Any substantial variance beyond this critical range results in unsatisfactory operation and an inferior product. If the angle is less than about 10°, the steam blast does not obtain an effective grip on the flowing glass so that the pulling action is comparatively weak, resulting in relatively coarse fibers. On the other hand, if the angle between the impinging gas or steam in the flowing glass is greater than about 14°, the pull on the glass is also reduced. A greater angle also results in objectionable turbulence and cross current. This turbulence interferes with the steam jet pattern and prevents continuous and uniform pulling and attenuation of the glass to fine fibers. It also interferes with the downward suction of air which is induced through the passageway 11 by the steam blast, and may cause back drafts which carry some of the glass fibers with them. When this occurs, a portion of the upwardly moving glass may be carried back to the feeder outlets so that the latter are fouled, interfering with or stopping the stream flow of glass.

The positioning of the blower with respect to the feeder outlet is important, and accordingly the blower should be mounted to permit both tilting and angular horizontal adjustment of the blower, and to be adjustable up and down or in a horizontal plane with respect to the feeder. Ordinarily, satisfactory operation necessitates an exact adjustment of each blower so that it is perfectly horizontal or level and perfectly centered or registered with respect to the associated feeder. If the blower is not level, the volume of induced air entering the blower is greater on one side than on the other, resulting in an unbalanced condition. This unbalance causes an accentuated turbulence of the blast along one side of the blower slot, and disrupts the desired steam jet pattern so essential for efficient operation. Moreover, if the blower is not aligned properly, there is a tendency for the individual fibers to strike against the side walls of the slot or passageway 11, or the skirts of the blower, causing these parts to wear away and deleteriously affect the steam pattern and efficiency of the blower.

The vertical distance between the blower and the bushing outlets 26 may be regulated in order to produce most efficiently the desired type of wool. The vertical distance between the blower and bushing outlets determines in part the velocity of the induced air, which in turn affects the amount of pull on the glass stream entering the blower, influences the amount of whip on the glass streams, and within limits, determines the temperature of the bushing at the outlet orifices, since the induced air is drawn over the outlets and causes them to cool.

The distance between the blower and bushing tips, also within limits, determines the temperature of the glass when it is acted upon by the stream.

Thus a decrease in the vertical distance results in increased pull on the glass streams as they enter the blower, decreased temperature at the bushing tips, increased whip of the glass streams, and within limits tends to raise the temperature of the glass at the point of steam action. The effect upon the fibers is to reduce them in diameter, and in general causes them to decrease in average length.

On the other hand an increase in the vertical distance results in an increased temperature in the bushing tips, decreased pull on the glass stream as it enters the blower, a decrease in whip on the glass stream, and within limits, a tendency to lower the temperature of the glass at the point of steam action. Its effect upon the glass is to increase production, produce larger fiber diameter, and to produce long fibers.

Thus, the standard vertical distances may vary for different types of wool desired. For a fine quality, long fine wool for heat insulation purposes, textiles or the like, a distance of about one-eighth of an inch has been found satisfactory. For a higher production rate wherein a whipping action method is utilized to produce high production rates, a distance of about a quarter of an inch may be used. If coarse wool, as, for example, for air filtering purposes is desired, a larger distance of about five-eighths of an inch or the like may be used. These distances, however, are only to be used as guides and are not to be construed as limiting the present invention.

The spacing of the individual jets from each other is an important feature of the invention in that a much better operating efficiency is achieved, and a greater saving in steam consumption may be effected. I have found that by providing a multiplicity of spaced apart jets arranged in rows, causing them to converge into a series of parallel, spaced apart blasts, relatively quiescent zones exist between the adjacent blasts. It is into these relatively quiescent zones that the induced air and the streams are mainly caused to flow. Without these spaced apart quiescent zones, the glass streams find difficulty in entering into the steam blasts as there is a tendency for the glass to ride up on top of the converging blasts and accumulate there until a sufficient body has formed which will penetrate into this steam blast. The quiescent zones, however, overcome this difficulty and facilitate the introduction of induced air which carries the glass streams into the steam blasts where they may be acted upon continually and uniformly with minimum interruption of the stream flow. The use of a multiplicity of spaced apart jets also effects a material saving in steam, in that the ejection of steam is only required at spaced intervals, and not throughout the entire length of the slot. It has been found that the spacing between the individual jets may be varied within certain limits, but that these limits ordinarily are about one-sixteenth to about three-eighths of an inch on centers, preferably about an eighth of an inch spacing on centers. With too wide spacing the fibers are ineffectively seized by the blast, and with too close spacing, the above noted benefits are not achieved and the efficiency of the operation falls off.

The spacing between the two blower blocks 10, defining the passageway 11, is also of great importance, since it determines the point of intersection of the steam jets and the distance the steam would travel before intersecting and attenuating the glass streams. If this point is located too far from the orifices, the steam force would be negligible, regardless of the initial velocity. Conversely, if the point of intersection is located too close to the orifices, a greater amount of force will be active at the point of intersection, and if this is too great, it will tend to resist the entrance of the glass through the relatively quiescent zones in between the adjacent jets and into the steam blasts.

Moreover, if the spacing of the passageway 11 is too small, the glass streams may be whipped against the edges of the skirt, causing grooves to be cut into it. These grooves would destroy the correct pattern of steam and destroy the efficiency of the blower. While the present invention is not to be construed to be limited to the following spacings, nevertheless, these are set forth as guides representative of efficient blower spacings. For the manufacture of high production wool, wherein a whipping action method is employed, a slot spacing of about five-sixteenths of an inch is generally satisfactory. For a finer quality of wool produced by a straight pulling operation, a smaller blower spacing, as, for example, about a quarter of an inch, may be used. For a very coarse wool, such as, for example, used for air filters of the impingement type, a larger blower spacing, as, for example, seven-sixteenths of an inch, may be used.

It has been found preferable in the practice of the invention to provide a steam blast which is incompletely expanded. To produce this, the steam may be discharged through relatively straight sided orifices or nozzles, as depicted in Fig. 4, although other contours such as slightly convergent, rounded or the like, may also be used. As the blasts leave the nozzles, or jets, the steam continues to expand and have a lateral component of movement. Moreover, the velocity of the steam at various points along the cross-section of the blast is different. The velocity in the center of the blast is, in general, considerably higher than the velocity of the blast at the outer marginal fringe. This differential of speed in the lateral expanding movement of the steam may enhance, if desired, a whipping action of the glass filaments.

Thus, if the temperature of the glass is relatively high and the glass quite fluid when it emerges from the outlets 26, the turbulence of the blast and variation in velocity of the blast throughout the cross-section thereof may facilitate a sharp whipping and/or fluttering of the filaments whereby they are attenuated simultaneously at a multiplicity of points along their length and the total attenuation upon the individual streams may be much greater than would be possible were the stream to be attenuated merely along one portion of its length continually in a downward direction, that is, by the straight pulling operation.

However, if the temperature of the glass is relatively low, the stream may be chilled to a point where whipping would become ineffective, and the attenuation may be continued downwardly in a straight line and long fine substantially endless filaments may thus be produced.

Fig. 5 illustrates two blowers which may be of the construction just described, in combination with a furnace 22. The furnace comprises a forehearth with outlet openings extending through the floor thereof for the passage of molten glass or other material. Bushings 23 are removably attached to the floor of the forehearth or feeder and each is provided with a row of openings 26 through which streams 24 of glass flow downwardly to the blowers 9 and through the passageway 11 therein. The pipes 15 through which steam or other gas is conveyed to the blowers are shown in branch pipes extending from a main supply pipe 25. The branch pipes 15 also serve as support for the blowers.

Various modifications and variations may be resorted to within the spirit and scope of the present invention as defined in the appended claims. The blower may also be successfully used in combination wth a mechanical drawing operation.

I claim:

1. The method of producing a multiplicity of glass fibers which comprises establishing a series of parallel spaced apart blasts of gases moving at a high velocity and separated at their origin by relatively quiescent zones, and introducing concurrently into said series of blasts through said relatively quiescent zones between said blasts a plurality of individual streams of molten glass to cause said streams to be attenuated by said blasts to long fine fibers.

2. The method of producing a multiplicity of glass fibers which comprises directing two rows of spaced apart jets of gases moving at high velocity against each other at an acute angle to cause their confluence into a series of spaced apart blasts, and introducing into said series of blasts in proximity to the line of confluence of said jets a plurality of streams of molten glass to cause said streams to be attenuated by said blast into glass fibers and simultaneously cool said streams to solidification as they are being attenuated.

3. The method of producing a multiplicity of glass fibers which comprises directing two rows of spaced apart jets of gases moving at a high velocity against each other at an acute angle to cause their confluence into a series of spaced apart blasts, permitting surrounding atmospheric air to be induced into said series of blasts, and introducing into said series of blasts in proximity to the line of confluence of said jets a plurality of streams of molten glass to cause said streams to be attenuated by said blasts into glass fibers and simultaneously be cooled to cause them to solidify as they are being attenuated.

4. The method of producing a multiplicity of glass fibers which comprises directing two rows of spaced apart jets of gases moving at a high velocity against each other at an acute angle to cause their confluence into a series of spaced apart blasts, permitting surrounding atmospheric air to be induced into said series of blasts, and introducing into said series of blasts in proximity to the line of confluence of said jets a plurality of streams of molten glass to cause said streams to be attenuated by said blasts into glass fibers and simultaneously be cooled to cause them to solidify as they are being attenuated, the points of confluence of said blasts being separated by relatively quiescent regions into each of which is introduced one of said streams.

5. Apparatus for producing glass fibers which comprises means for flowing a series of individual streams of molten glass arranged in a row, a blower having a slot providing a passageway through which said streams are caused to flow, the blower on each side of said slot being provided with a row of spaced apart nozzles through which jets of gas under pressure are discharged, said nozzles being arranged to direct the rows of jets against each other at an acute angle to cause their confluence into a series of spaced apart blasts, whereby said series of spaced apart blasts envelop said streams concurrently and cause them to be drawn out by the force of the blasts into the form of glass fibers.

6. Apparatus for producing glass fibers, which comprises means for providing a plurality of streams of molten glass arranged in a row, a blower spaced apart from and positioned beneath said means, said blower having a slot providing a passageway through which said streams are caused to flow, said blower provided on each side of said slot with a row of spaced apart nozzles through which a row of jets of gas under pressure are discharged, said nozzles being arranged to direct the respective rows of jets against each other at an acute angle to cause their confluence into a series of spaced apart blasts, said blasts causing the induction of surrounding atmospheric air and the streams of molten glass which are caused to be attenuated concurrently by said blasts into glass fibers.

7. A blower comprising a horizontally disposed body having opposite faces spaced to provide an elongated passageway opening through the blower from top to bottom, pressure chambers within said body on opposite sides of said passageway, said blower formed with channels from the pressure chambers to said faces, said channels providing openings extending along said faces on opposite sides of the passageway, and plates mounted on said faces and extending downward and covering said openings, said plates constructed to provide passageways from said openings downward over said faces.

8. A blower comprising a horizontally disposed body having opposite faces spaced to provide an elongated passageway opening through the blower from top to bottom, pressure chambers within said body on opposite sides of said passageway, said blower formed with channels from the pressure chambers to said faces, said channels providing openings extending along said faces on opposite sides of the passageway, and plates mounted on said faces and extending downward and covering said openings, said plates having grooves formed in their inner faces and providing passageways through which gas under pressure is directed from said openings.

9. A blower comprising a horizontally disposed body having opposite faces spaced and arranged to form a passageway extending vertically downward through said body, said passageway extending lengthwise of the blower, the blower being formed with pressure chambers and channels extending from said chambers to said opposite faces, said channels providing openings in said faces extending lengthwise thereof, and baffle plates overlying said faces and extending downward and covering said openings, said plates having portions spaced from said faces to provide passageways for gases issuing from said chamber through said openings.

10. A blower comprising a horizontally disposed body having opposite faces spaced and arranged to form a passageway extending vertically downward through said body, said passageway extending lengthwise of the blower, the blower being formed with pressure chambers and channels extending from said chambers to said opposite faces, said channels providing openings in said faces extending lengthwise thereof, and baffle plates overlying said faces and extending downward and covering said openings, said baffle plates having a multiplicity of narrow grooves formed in their inner faces separated by narrow ribs, said grooves forming downwardly directed channels communicating with said openings.

11. A blower comprising a horizontally disposed body having opposite faces spaced and arranged to form a passageway extending vertically downward through said body, said passageway extending lengthwise of the blower, the blower being formed with pressure chambers and channels extending from said chambers to said opposite faces, said channels providing openings in said faces extending lengthwise thereof, and baffle plates overlying said faces and extending downward and covering said openings, said baffle plates having a multiplicity of narrow grooves formed in their inner faces separated by narrow ribs, said grooves forming downwardly directed channels communicating with said openings, said faces and plates being downwardly and inwardly convergent, whereby a multiplicity of downwardly and inwardly convergent streams or jets of gas are supplied from said blower.

12. The combination of a container for molten glass, a bushing in the floor of the container, said bushing formed with a single straight row of openings therethrough, through which the glass flows in a row of streams, a blower having a passageway therethrough from top to bottom, the opposite walls of said passageway being substantially straight and approximately vertical and parallel with said row of openings and said row of streams, said blower being so positioned that said streams are caused to pass through said passageway, and means cooperating with said walls to provide a multiplicity of downwardly moving jets of gas under pressure arranged to impinge on said streams and thereby draw the glass into threads or filaments.

13. The combination of means providing a plurality of streams of molten glass flowing downwardly through space and arranged side by side in a row, and blowing mechanism including means for supplying a multiplicity of downwardly directed jets of gas on each side of said row of streams, said means arranged to cause the gas jets to impinge upon and envelop the streams of glass and draw them into fine threads or filaments, said jets being arranged in parallel rows on opposite sides of said row of streams and uniformly spaced from the streams in a manner to apply a substantially equal drawing force to all of said streams.

14. A blower comprising a horizontally disposed body having opposite substantially flat faces spaced apart and providing an unobstructed straight passageway opening through the blower from top to bottom through which streams of molten material may descend without contact with the said faces, the length of said passageway being many times its width, pressure chambers within said body on opposite sides of the passageway, the blower being formed with channels from the pressure chambers to said faces, and means providing a multiplicity of narrow passageways communicating with said channels and extending downwardly therefrom over said faces.

15. The combination of a container for molten glass, said container being formed with a row of outlet openings through the floor thereof, through which the glass flows in a row of streams, a horizontally disposed blower positioned beneath said container and spaced below said outlets, said blower being formed with a straight elongated passageway extending therethrough from top to bottom and positioned to permit said streams to flow downward therethrough, the opposite walls of said passageway being approximately vertical, the width of said passageway being less than the distance between adjoining streams of glass flowing therethrough, means for supplying gas under pressure to the blower, and means cooperating with said walls to provide a multiplicity of channels into and through which the gas is directed in a multiplicity of jets moving in downwardly convergent directions on opposite sides of said streams and thereby drawing the glass into attenuated threads or filaments, there being a multiplicity of said jets for each said stream of glass, said jets arranged to supply a substantially equal drawing force to all of said streams.

16. The combination of means for flowing a multiplicity of closely spaced streams of molten material arranged in a row, a blower having an exterior surface adjacent the path of said streams, said blower comprising a pressure chamber and a channel extending from said chamber to said exterior surface of the blower, said channel forming an opening through and extending lengthwise of said surface in a direction transverse to and traversing said row of streams, and a substantially straight baffle plate overlying said surface and opening and interposed between said streams and the blower, the inner face of said plate being formed to provide a multiplicity of closely spaced channels extending from said opening along said surface transversely of said opening for the passage of gas from said pressure chamber, said baffle plate being arranged to completely cover and seal said opening except through said channels and thereby prevent the escape of gas therethrough except by way of said channels.

17. A blower comprising pressure chambers having exterior wall surfaces arranged opposite each other and spaced to provide a narrow, elongated passageway, V-shaped in cross-section, and channels extending from said chambers to said exterior surfaces, said channels forming openings through and extending lengthwise of said surfaces, and substantially straight baffle plates overlying said surfaces and covering said openings, each plate formed with a multiplicity of closely spaced grooves on its inner face extending downward from the opening covered by said plate and providing restricted passageways extending from said opening along said surface, said baffle plates being arranged to completely cover and seal said openings except through said passageways and thereby prevent the escape of gas therethrough except by way of said passageways.

18. Apparatus for producing fine fibers from molten material, which comprises means for flowing a row of streams of the molten material, a blower formed with a narrow, elongated passageway extending transversely of the streams and embracing said row of streams, said blower including means for causing gas under pressure to enter said passageway in the form of a multiplicity of individual jets arranged along the passageway in rows parallel with the said row of streams, the said jets being closely spaced so that they commingle and form sheets of gas embracing the said row of streams, the jets being directed to caused said sheets to impinge on said streams while moving at a high velocity in the general direction of said streams and with the pressure distributed uniformly along said row.

GAMES SLAYTER.